Patented Aug. 16, 1927.

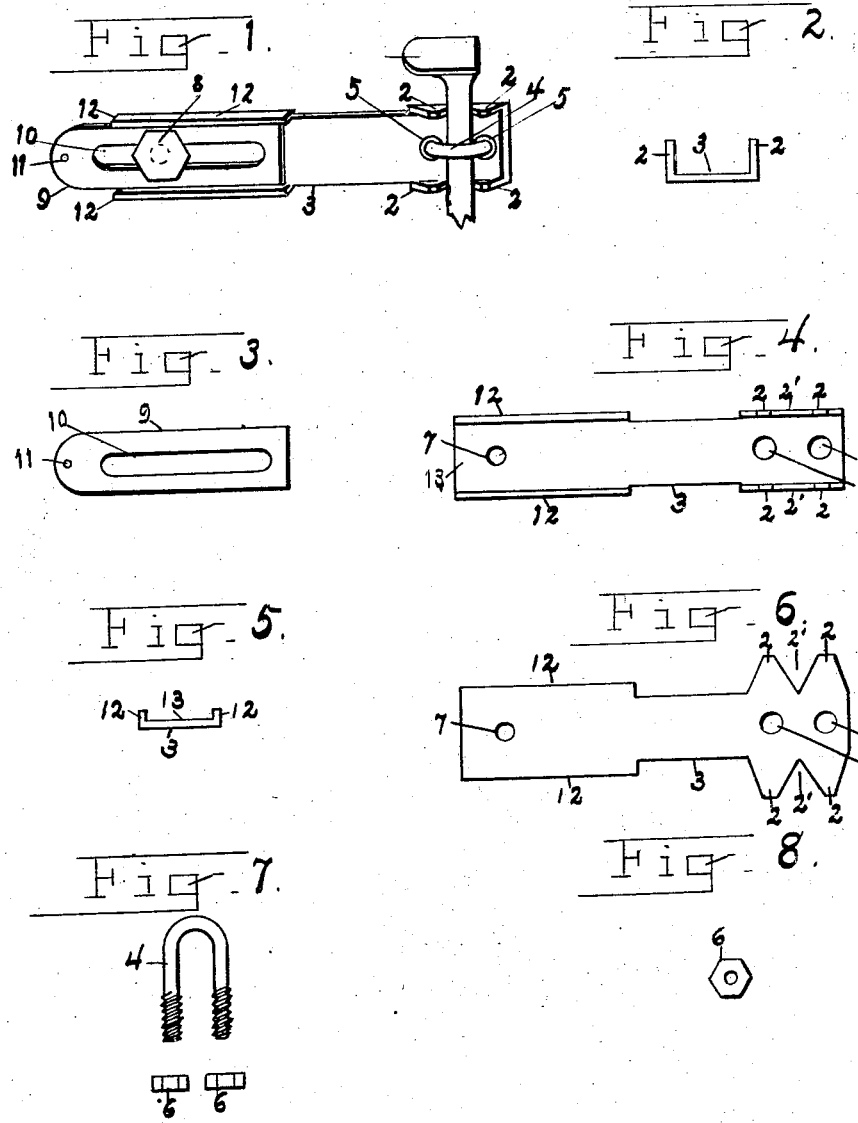

1,639,375

UNITED STATES PATENT OFFICE.

ARTHUR SAMUEL GREENBERG, OF NEW YORK, N. Y.

ADJUSTABLE EXTENSION FOR TREADLES.

Original application filed June 26, 1926, Serial No. 118,747. Divided and this application filed June 26, 1926. Serial No. 118,746.

My invention relates to improvements in adjustable extension for treadles and has for its objects, to provide a new article of manufacture; to provide a treadle with an adjustable extension arm and means for securing it to a treadle; to provide the same with means for detachably securing it to a treadle; to provide the same with integral means for securing it to a treadle; to provide means for adjusting the length of said arm; to provide detachable means for adjusting the length of said arm.

These objects I accomplish by the devices illustrated in the accompanying drawings, in which Fig. 1 illustrates the clutch pedal of an automobile, showing my extension arm with its adjustable extension piece, secured to the said clutch pedal.

Fig. 2 is the end view of the clamping jaws.

Fig. 3 is a perspective view of my extension member.

Fig. 4 is a perspective view of my extension arm, without the extension member.

Fig. 5 is the end view of my extension arm where the extension member enters the arm.

Fig. 6 is a plan view of the blank before it is struck up into my extension arm.

Fig. 7 is my clamping U-shaped bolt with nuts in side elevation.

Fig. 8 is a plan view of one of the nuts.

Referring to the numerals,—

1 is the pedal of a clutch pedal of an automobile. 2— are the clamping jaws integrally formed and struck up with the extension arm 3 and together with the U-shaped bolt 4 form the clamp for securing said extension arm to said clutch pedal 1, in the space 2' between the said jaws.

The ends of the U-shaped bolt 4 pass through the holes 5 punched in the extension arm 3 and are threaded in engagement with the threaded nuts 6, and by tightening up the said nuts the said extension arm is fixed to the clutch pedal or any other pedal, or treadle.

Near the end away from the said clamping jaws, another hole 7 is punched in the extension arm 3 and preferably tapped to receive the threaded cap-screw or bolt 8 which fastens the slidably mounted extension member 9 provided with an elongated slot 10 through which said cap-screw or bolt passes to permit the adjustment of said extension member 9 to modify the length of said extension arm.

The sides 12 of my extension arm 3 are struck up to form the channel 13 in which the slidably mounted extension member 9 is held in alignment with said extension arm.

Near the end of the slidably mounted extension member 9 is punched a hole 11 in which to secure a belt-clip or pitman.

In manufacturing my extension arm, a blank is punched from sheet material as shown in Fig. 6 and the sides are struck up to make the jaws 2 as well as the sides 12 to make the channel to receive the extension member 9.

This is a division of my application #118,747 for windshield cleaners filed on June 26, 1926.

What I claim is—

1. An adjustable extension for treadles comprising an arm formed of sheet material and comprising sides formed by bending the material at right angles to its face, and at one end of the said sides provided with aligned slots to form jaws for engaging the sides of a treadle lever, means in the bottom of said arm for entering a U-bolt, an extensible member slidably mounted to said arm and spaced from said jaws, and means secured to said arm for clampingly engaging said extension member, and means for securing a belt to said extension member.

2. An adjustable extension for treadles comprising an arm formed of sheet material and comprising sides formed by bending the material at right angles to its face and at one end of the said sides provided with aligned slots to form jaws for engaging the sides of a treadle lever and holes in the bottom of said arm adjacent said jaws for entering a U-bolt and a hole near the opposite end of said arm for entering a bolt, and a slidably mounted extension piece between said sides of said arm provided with an elongated slot, a bolt passing through said slot and said hole for clampingly engaging said slidably mounted extension piece, and means for securing a belt to said extension piece.

ARTHUR SAMUEL GREENBERG.